US012800953B2

(12) United States Patent
Saeki et al.

(10) Patent No.: US 12,800,953 B2
(45) Date of Patent: Nov. 17, 2026

(54) OPTICAL MODULE

(71) Applicant: SUMITOMO ELECTRIC INDUSTRIES, LTD., Osaka (JP)

(72) Inventors: Tomoya Saeki, Osaka (JP); Morihiro Seki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 492 days.

(21) Appl. No.: 18/359,104

(22) Filed: Jul. 26, 2023

(65) Prior Publication Data

US 2024/0069367 A1 Feb. 29, 2024

(30) Foreign Application Priority Data

Aug. 30, 2022 (JP) ................................ 2022-136773

(51) Int. Cl.
*G02F 1/01* (2006.01)
*G02F 1/21* (2006.01)

(52) U.S. Cl.
CPC .......... *G02F 1/0142* (2021.01); *G02F 1/0102* (2013.01); *G02F 1/0113* (2021.01); *G02F 1/212* (2021.01)

(58) Field of Classification Search
CPC .... G02F 1/0142; G02F 1/0102; G02F 1/0113; G02F 1/212; G02B 6/4206; G02B 6/4213; G02B 6/4246; G02B 6/4286; G02B 6/4295
See application file for complete search history.

(56) References Cited

U.S. PATENT DOCUMENTS

| | | | |
|---|---|---|---|
| 5,787,215 | A | 7/1998 | Kuhara et al. |
| 6,043,550 | A | 3/2000 | Kuhara et al. |
| 6,370,290 | B1 | 4/2002 | Ball et al. |
| 6,766,082 | B2 | 7/2004 | Hirabayashi et al. |
| 7,275,877 | B2 | 10/2007 | Go |
| 8,391,651 | B2 | 3/2013 | Ichikawa |
| 8,396,334 | B2 | 3/2013 | Ichikawa |

(Continued)

FOREIGN PATENT DOCUMENTS

| | | | |
|---|---|---|---|
| JP | 2009-229592 A | | 10/2009 |
| JP | 5157409 B2 | * | 3/2013 |

(Continued)

OTHER PUBLICATIONS

F. Schiappelli et al., “Efficient fiber-to-waveguide coupling by a lens on the end of the optical fiber fabricated by focused ion beam milling”, Science Direct, Mar. 19, 2004, p. 398-p. 404.

(Continued)

*Primary Examiner* — Sharrief I Broome
*Assistant Examiner* — K Muhammad
(74) *Attorney, Agent, or Firm* — McDonald Hopkins LLC

(57) ABSTRACT

An optical module of one embodiment includes a semiconductor modulator having a rectangular planar shape, an input lens system facing the input port, a first output lens system facing the first output port, a second output lens system facing the second output port, a first monitor element facing the first monitor port, a second monitor element facing the second monitor port, a first polarizer disposed between the first monitor port and the first monitor element, and a second polarizer disposed between the second monitor port and the second monitor element.

4 Claims, 9 Drawing Sheets

(56) References Cited

U.S. PATENT DOCUMENTS

| | | | |
|---|---|---|---|
| 8,721,194 B2 | 5/2014 | Huang et al. | |
| 8,923,673 B2 | 12/2014 | Katou et al. | |
| 9,059,805 B2 | 6/2015 | Mak et al. | |
| 9,366,832 B2 | 6/2016 | Arao et al. | |
| 9,448,457 B2 | 9/2016 | Itou et al. | |
| 9,477,051 B2 | 10/2016 | Oki et al. | |
| 9,490,900 B2 | 11/2016 | Saeki et al. | |
| 9,780,882 B2 | 10/2017 | Saeki et al. | |
| 10,761,352 B1 * | 9/2020 | Grehn | G02F 1/011 |
| 11,347,126 B2 * | 5/2022 | Saeki | G02F 1/025 |
| 2004/0264888 A1 | 12/2004 | Go | |
| 2005/0083568 A1 | 4/2005 | Nakae et al. | |
| 2005/0128924 A1 | 6/2005 | Nakae et al. | |
| 2007/0053625 A1 | 3/2007 | Ichioka et al. | |
| 2009/0097843 A1 * | 4/2009 | McBrien | H04B 10/505 398/16 |
| 2009/0116781 A1 | 5/2009 | Ichikawa | |
| 2009/0238512 A1 | 9/2009 | Sugiyama | |
| 2012/0020607 A1 | 1/2012 | Ichikawa | |
| 2012/0075637 A1 | 3/2012 | Sangawa et al. | |
| 2013/0051024 A1 | 2/2013 | Amit | |
| 2013/0209021 A1 * | 8/2013 | Hayashi | G02B 6/12007 385/2 |
| 2013/0287406 A1 | 10/2013 | Huang et al. | |
| 2014/0023310 A1 | 1/2014 | Katou et al. | |
| 2014/0308047 A1 | 10/2014 | Mak et al. | |
| 2015/0042943 A1 | 2/2015 | Hatanaka et al. | |
| 2015/0043071 A1 | 2/2015 | Hatanaka et al. | |
| 2015/0104177 A1 | 4/2015 | Kato et al. | |
| 2015/0147018 A1 | 5/2015 | Itou et al. | |
| 2015/0286016 A1 | 10/2015 | Arao et al. | |
| 2015/0326319 A1 | 11/2015 | Oki et al. | |
| 2015/0333833 A1 | 11/2015 | Saeki et al. | |
| 2016/0028489 A1 | 1/2016 | Saeki et al. | |
| 2016/0170146 A1 | 6/2016 | Kurokawa et al. | |
| 2016/0344156 A1 | 11/2016 | Rothberg et al. | |
| 2017/0019181 A1 | 1/2017 | Flintham et al. | |
| 2017/0033884 A1 | 2/2017 | Sugiyama et al. | |
| 2017/0184802 A1 * | 6/2017 | Saeki | G02B 6/4206 |
| 2017/0227724 A1 | 8/2017 | Yamaji et al. | |
| 2017/0242316 A1 | 8/2017 | Horiguchi et al. | |
| 2019/0041581 A1 * | 2/2019 | Sugiyama | H01S 5/0687 |
| 2021/0011216 A1 | 1/2021 | Fujii | |
| 2021/0055623 A1 * | 2/2021 | Saeki | G02F 1/025 |
| 2023/0288737 A1 | 9/2023 | Nagashima et al. | |

FOREIGN PATENT DOCUMENTS

| | | | | |
|---|---|---|---|---|
| JP | 2017-026988 A | 2/2017 | | |
| JP | 2017-513071 A | 5/2017 | | |
| JP | 2017-151417 A | 8/2017 | | |
| JP | 2019159077 A * | 9/2019 | | |
| JP | 2021-012334 A | 2/2021 | | |
| JP | 2021-509483 A | 3/2021 | | |
| WO | 2015/135821 A1 | 9/2015 | | |
| WO | 2016/067617 A2 | 5/2016 | | |
| WO | 2017/085447 A1 | 5/2017 | | |
| WO | 2019/131804 A1 | 7/2019 | | |
| WO | WO-2022100278 A1 * | 5/2022 | | H01S 5/00 |
| WO | 2022/118790 A1 | 6/2022 | | |

OTHER PUBLICATIONS

US Office Action issued in U.S. Appl. No. 16/957,920 dated Sep. 28, 2021.

US Notice of Allowance issued in U.S. Appl. No. 16/957,920 dated Apr. 1, 2022.

* cited by examiner

OPTICAL MODULE

CROSS REFERENCE TO RELATED APPLICATIONS

This application claims priority based on Japanese Patent Application No. 2022-136773 filed on Aug. 30, 2022, and the entire contents of the Japanese patent application are incorporated herein by reference.

TECHNICAL FIELD

The present disclosure relates to an optical module.

BACKGROUND

PTL 1 describes an optical module. The optical module includes a housing, an input assembly and an output assembly attached to a side wall of the housing, and a semiconductor modulator disposed inside the housing. The semiconductor modulator includes an input port, a first output port, a second output port, a dividing portion, a first multiplexing portion, a second multiplexing portion, a plurality of arm waveguides, a first monitor port, and a second monitor port.

The input port inputs continuous light from the input assembly. The dividing portion divides the continuous light input from the input port into eight arm waveguides. The first multiplexing portion multiplexes a part of the signal lights propagated through the four arm waveguides and provides the multiplexed signal light to the first output port as a first output light. The second multiplexing portion multiplexes the rest of the signal lights propagated through the other four arm waveguides and provides the multiplexed signal light to the second output port as a second output light.

The semiconductor modulator includes eight modulation electrodes, four parent phase adjustment electrodes, and eight child phase adjustment electrodes. The modulation electrode is provided on the arm waveguide and applies a modulated voltage signal to the arm waveguide to change the refractive index of light in the arm waveguide. Thus, the phase of the light of the arm waveguide is modulated.

The optical module includes an input lens system for optically coupling the input assembly and the input port of the semiconductor modulator to each other, and a first output lens system and a second output lens system for optically coupling the output assembly and the first output port and the second output port, respectively, of the semiconductor modulator to each other. The optical module includes a first monitor PD (Photo Diode) disposed on an optical axis of the first monitor port and a second monitor PD disposed on an optical axis of the second monitor port. The first monitor PD receives the monitor signal light output from the first monitor port, and the second monitor PD receives the monitor signal light output from the second monitor port. PTL 1: Japanese Unexamined Patent Application Publication No. 2021-509483

SUMMARY

An optical module according to the present disclosure includes a semiconductor modulator having a rectangular planar shape and having an input port for receiving continuous light, a first output port, a second output port, a first monitor port, and a second monitor port, the semiconductor modulator being configured to perform phase modulation of divided light rays obtained by dividing the continuous light, generate first output light output from the first output port by converting one of the divided light rays into a modulation signal, and generate second output light output from the second output port by converting another one of the divided light rays into a modulation signal, the first monitor port being configured to monitor the first output light, the second monitor port being configured to monitor the second output light, an input lens system facing the input port, a first output lens system facing the first output port, a second output lens system facing the second output port, a first monitor element facing the first monitor port, a second monitor element facing the second monitor port, a first polarizer disposed between the first monitor port and the first monitor element, and a second polarizer disposed between the second monitor port and the second monitor element. The semiconductor modulator has a side surface. At the side surface, the first output port and the second output port are each disposed on a corresponding one of two sides of the input port. The first monitor port is disposed on a side of the first output port, the side being opposite to a side thereof where the input port is disposed. The second monitor port is disposed on a side of the second output port, the side being opposite to a side thereof where the input port is disposed.

DETAILED DESCRIPTION

Figure 1:
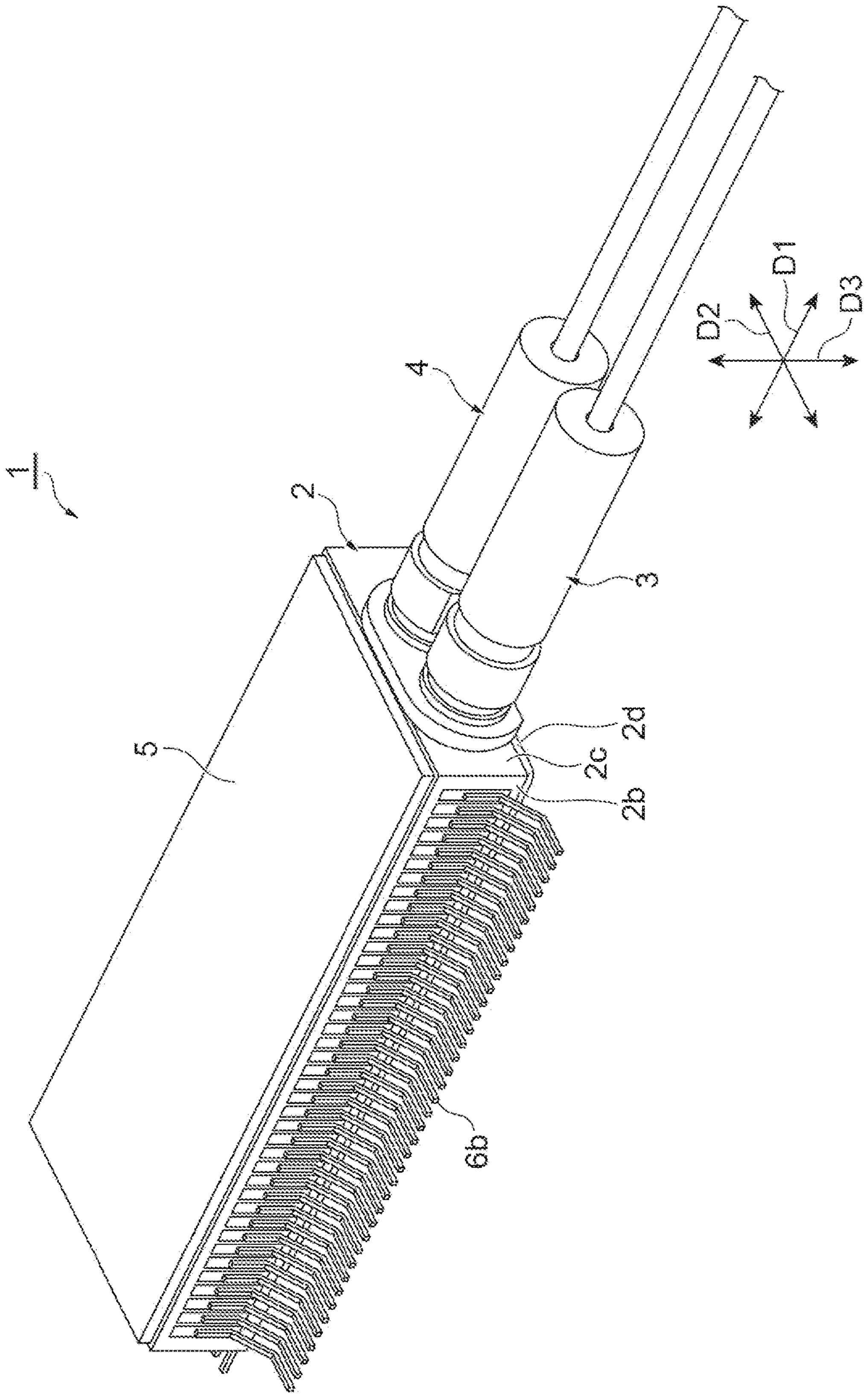
FIG. 1 is a perspective view of an optical module according to one embodiment.

In the semiconductor modulator, there is a case where a deviation occurs in a polarization state inside the semiconductor modulator. This deviation is wavelength dependent. When the polarization state is deviated, leakage light including a deviated polarized light component is generated. This leakage light may be optically coupled to a monitor element such as a monitor PD disposed outside the semiconductor modulator. When the leakage light including the deviated polarized light component is optically coupled to the monitor element, the operation of the optical module may be affected.

It is an object of the present disclosure to provide an optical module capable of reducing leakage light including a deviated polarized light component to a monitor element.

DESCRIPTION OF EMBODIMENTS OF PRESENT DISCLOSURE

First, the contents of embodiments of an optical module according to the present disclosure will be listed and described. (1) An optical module according to an embodiment includes a semiconductor modulator having a rectangular planar shape and having an input port for receiving continuous light, a first output port, a second output port, a first monitor port, and a second monitor port, the semiconductor modulator being configured to perform phase modulation of divided light rays obtained by dividing the continuous light, generate first output light output from the first output port by converting one of the divided light rays into a modulation signal, and generate second output light output from the second output port by converting another one of the divided light rays into a modulation signal, the first monitor port being configured to monitor the first output light, the second monitor port being configured to monitor the second output light, an input lens system facing the input port, a first output lens system facing the first output port, a second output lens system facing the second output port, a first monitor element facing the first monitor port, a second monitor element facing the second monitor port, a first polarizer disposed between the first monitor port and the first monitor element and a second polarizer disposed between the second monitor port and the second monitor element. The semiconductor modulator has a side surface. At the side surface, the first output port and the second output port are each disposed on a corresponding one of two sides of the input port. The first monitor port is disposed on a side of the first output port, the side being opposite to a side thereof where the input port is disposed. The second monitor port is disposed on a side of the second output port, the side being opposite to a side thereof where the input port is disposed.

This optical module includes a semiconductor modulator having an input port, a first output port, a second output port, a first monitor port, and a second monitor port. An input lens system faces the input port. A first output lens system faces the first output port, and a second output lens system faces the second output port. The optical module includes a first monitor element facing the first monitor port and a second monitor element facing the second monitor port. A first polarizer is disposed between the first monitor port and the first monitor element, and a second polarizer is disposed between the second monitor port and the second monitor element. Therefore, each of the first polarizer and the second polarizer cuts off the deviated polarized light component, and the light from which the deviated polarized light component is cut off is input to the first monitor element and the second monitor element. Therefore, it is possible to reduce leakage light including a deviated polarized light component to the monitor element.

(2) In the above (1), at the side surface of the semiconductor modulator, the first output port and the second output port may be disposed at positions at which the first output port and the second output port are symmetrical with each other with respect to the input port, and the first monitor port and the second monitor port may be disposed at positions at which the first monitor port and the second monitor port are symmetrical with each other with respect to the input port.

DETAILS OF EMBODIMENTS OF PRESENT DISCLOSURE

Specific examples of an optical module according to embodiments of the present disclosure will be described below with reference to the drawings.

It should be noted that the present invention is not limited to the following examples, and is intended to include all modifications within the scope of the claims and the equivalents thereof. In the description of the drawings, the same or corresponding elements are denoted by the same reference numerals, and redundant description is omitted as appropriate. The drawings may be partially simplified or exaggerated for ease of understanding, and dimensional ratios and the like are not limited to those illustrated in the drawings.

Figure 2:
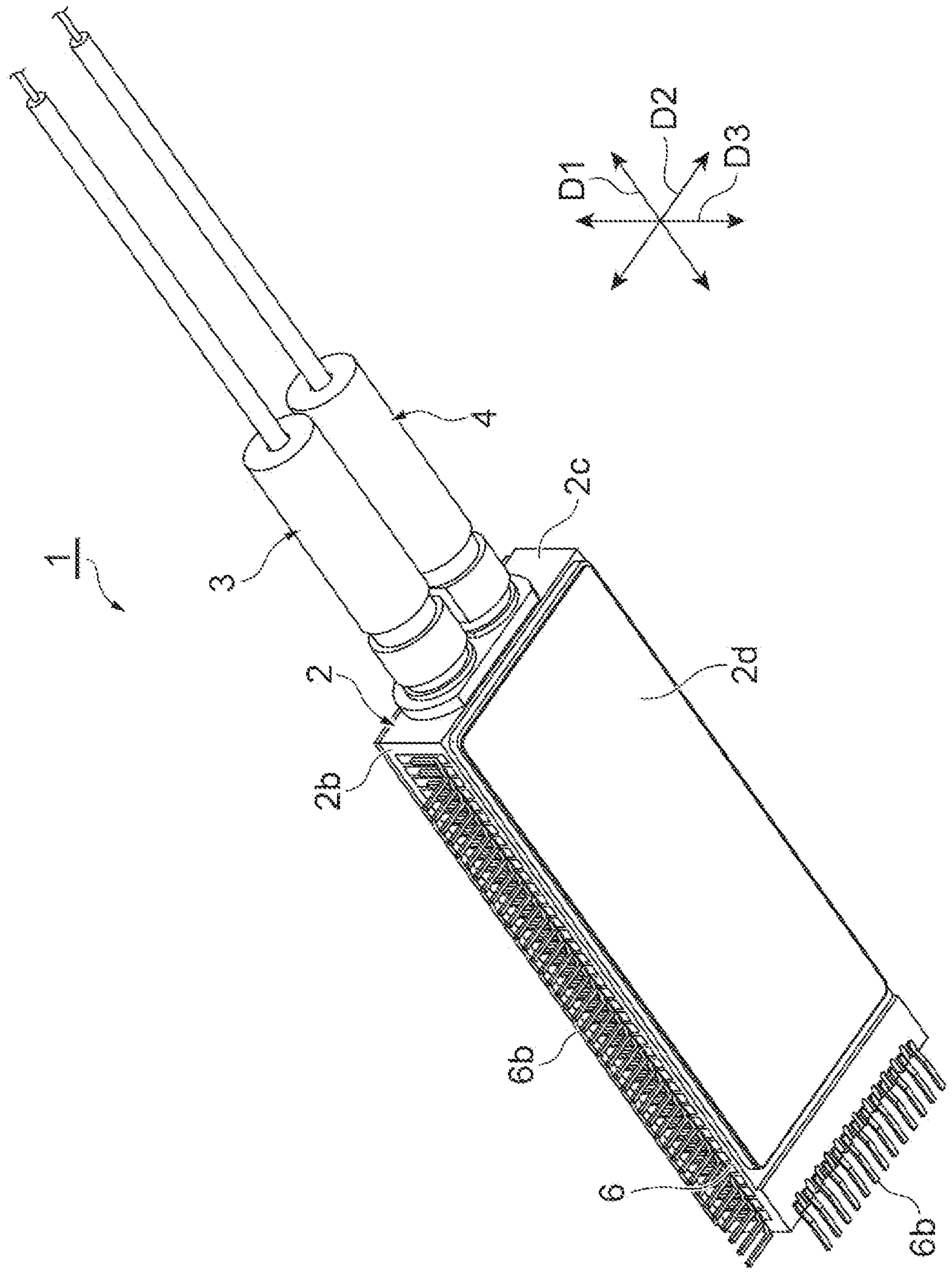
FIG. 2 is a perspective view of the optical module of FIG. 1 viewed from a direction different from that of FIG. 1.

FIG. 1 is a perspective view of an optical module 1 as an example. FIG. 2 is a perspective view of optical module 1 viewed from a direction different from that of FIG. 1. As shown in FIGS. 1 and 2, optical module 1 includes a rectangular parallelepiped housing 2, and an input assembly 3 and an output assembly 4 extending from housing 2. Each of input assembly 3 and output assembly 4 has a cylindrical shape. Housing 2 includes a pair of first side walls **2*b* extending along a first direction D1, a pair of second side walls 2*c* extending along a second direction D2 intersecting first direction D1, and a bottom wall 2*d* on which each component of optical module 1 is mounted. First direction D1 is the longitudinal direction of optical module 1, and second direction D2 is the width direction of optical module 1**.

First side wall **2*b* extends in both first direction D1 and a third direction D3. Third direction D3 is a direction intersecting both first direction D1 and second direction D2, and corresponds to the height direction of optical module 1. The pair of second side walls 2*c* are arranged along first direction D1, and each second side wall 2*c* extends in both second direction D2 and third direction D3. Bottom wall 2*d* extends in both first direction D1 and second direction D2 at one end in third direction D3 of first side wall 2*b* and second side wall 2*c***.

Figure 3:
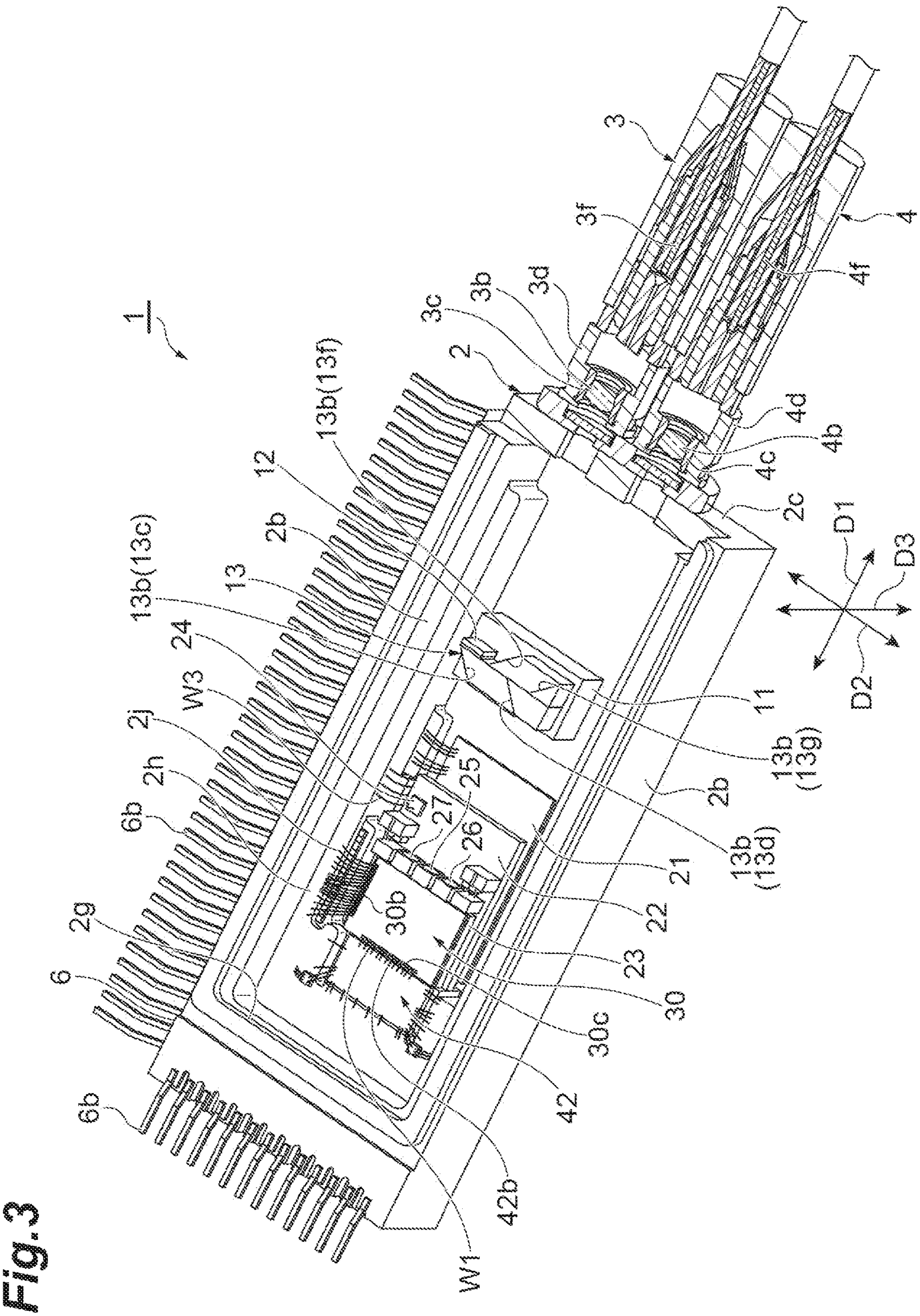
FIG. 3 is a perspective view showing the internal structure of the optical module of FIG. 1.
Figure 4:
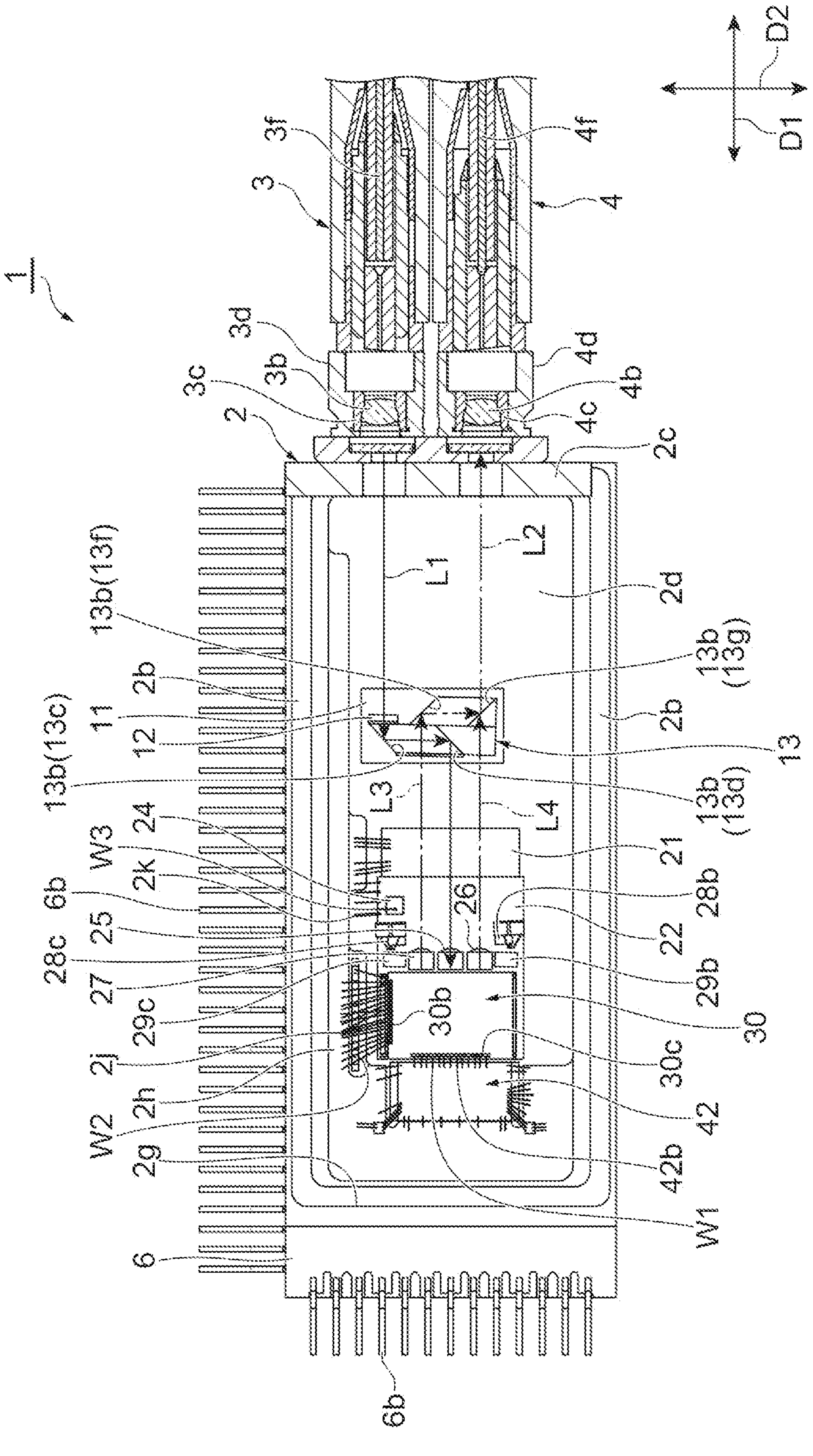
FIG. 4 is a plan view showing the internal structure of the optical module of FIG. 1.
Figure 5:
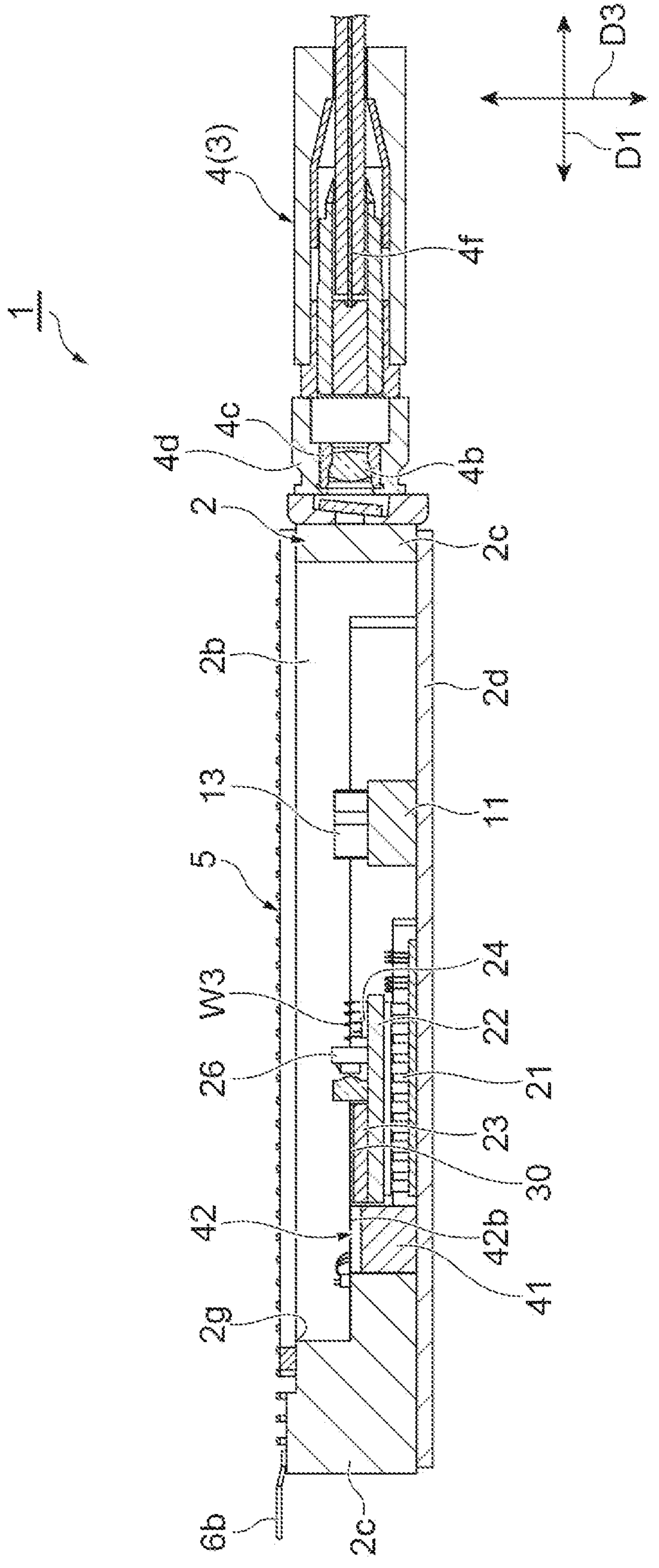
FIG. 5 is a cross-sectional side view of the optical module of FIG. 1.

FIG. 3 is a perspective view showing the internal structure of optical module 1. FIG. 4 is a plan view showing the internal structure of optical module 1. FIG. 5 is a longitudinal sectional view showing the internal structure of optical module 1.

As shown in FIGS. 3 to 5, the pair of first side walls **2*b* and the pair of second side walls 2*c* constitute an opening portion 2*g* of housing 2 having a frame shape when viewed from third direction D3. Optical module 1 includes a lid 5 that seals opening portion 2*g*. Lid 5 is made of metal. For example, in housing 2, a metal seal ring is joined to opening portion 2*g*, and lid 5 is joined to housing 2 via the seal ring. For example, lid 5 is joined to housing 2** by seam welding.

Input assembly 3 and output assembly 4 extend from one of the pair of second side walls **2*c* along first direction D1. Input assembly 3 and output assembly 4 are arranged along second direction D2. Input assembly 3 is a part for inputting an input light L1 from the outside of optical module 1 to the inside of optical module 1. Output assembly 4 is a part that outputs an output light L2 from the inside of optical module 1 to the outside of optical module 1**.

Input assembly 3 is a pigtail component that holds an optical fiber **3*f* that is a polarization maintaining fiber (PMF). Input assembly 3 includes a lens 3*b*, a lens holder 3*c* that holds lens 3*b*, a sleeve 3*d*, and optical fiber 3*f* that is optically coupled to lens 3*b*. Input light L1 is emitted from optical fiber 3*f*, and input light L1 transmits through lens 3*b* and is input into optical module 1**.

Output assembly 4 is a pigtail component that holds an optical fiber **4*f* that is a single mode fiber (SMF). Output assembly 4 includes a lens 4*b*, a lens holder 4*c* that holds lens 4*b*, a sleeve 4*d*, and optical fiber 4*f* that is optically coupled to lens 4***b*. Lens 4*b* condenses output light L2 from the inside of optical module 1 onto the tip surface of optical fiber 4*f*.

Optical module 1 has feedthroughs 6 provided in each of first side wall 2*b* and second side wall 2*c*. Feedthrough 6 has a plurality of lead pins 6*b*. The plurality of lead pins 6*b* are connected to, for example, a circuit board outside housing 2. The plurality of lead pins 6*b* include a lead pin for taking out an electric signal generated inside housing 2 to the outside of optical module 1, a lead pin for supplying a bias to an electric circuit inside housing 2, and a ground lead pin. In the embodiment of the present disclosure, the plurality of lead pins 6*b* are provided on each of first side wall 2*b* and second side wall 2*c*, but may be provided only on first side wall 2*b*.

Optical module 1 includes an optical base 11 mounted on bottom wall 2*d* and a composite optical component 13 including a filter 12 mounted on optical base 11. Filter 12 transmits input light L1 from input assembly 3. Filter 12 inputs input light L1 to composite optical component 13. Composite optical component 13 is disposed opposite to input assembly 3 with filter 12 between them. Composite optical component 13 has a plurality of reflection surfaces 13*b* for reflecting input light L1.

The plurality of reflection surfaces 13*b* include a first reflection surface 13*c*, a second reflection surface 13*d*, a third reflection surface 13*f*, and a fourth reflection surface 13*g*. First reflection surface 13*c* and second reflection surface 13*d* are arranged along second direction D2. The position of third reflection surface 13*f* in second direction D2 is deviated from the position of first reflection surface 13*c* in second direction D2 and the position of second reflection surface 13*d* in second direction D2. The position of fourth reflection surface 13*g* in second direction D2 is deviated from the position of first reflection surface 13*c* in second direction D2 and the position of second reflection surface 13*d* in second direction D2. Third reflection surface 13*f* and fourth reflection surface 13*g* are arranged along second direction D2.

Input light L1 incident on composite optical component 13 along first direction D1 from filter 12 is reflected in second direction D2 at first reflection surface 13*c*. Input light L1 reflected at first reflection surface 13*c* is reflected at second reflection surface 13*d* in first direction D1 and is emitted to the side opposite to input assembly 3.

An output light L3 and an output light L4, which will be described in detail later, are input to composite optical component 13 along first direction D1 from the side opposite to output assembly 4. Output light L3 is reflected at third reflection surface 13*f* in second direction D2. Output light L3 reflected at third reflection surface 13*f* is reflected at fourth reflection surface 13*g* in first direction D1. Output light L4 is transmitted through fourth reflection surface 13*g*. Composite optical component 13 outputs output light L3 and output light L4 to the outside of optical module 1 as output light L2.

Optical module 1 includes a temperature control device 21 mounted on bottom wall 2*d*, a modulation element base 22 mounted on temperature control device 21, a modulation element carrier 23 mounted on modulation element base 22, and a modulator (semiconductor modulator) 30 mounted on modulation element carrier 23. Temperature control device 21 is a thermo electric cooler (TEC). Furthermore, optical module 1 includes an input lens system 25, a first output lens system 26 and a second output lens system 27. Input lens system 25, first output lens system 26 and second output lens system 27 are mounted on modulation element base 22.

Modulator 30 is, for example, a multimode interferometer in which a Mach-Zehnder interferometer is formed on an indium phosphide (InP) substrate. Further, modulator 30 may be an element in which an optical waveguide is formed on a Si substrate. As an example, modulator 30 includes indium phosphide (InP), silicon dioxide ($SiO_2$) and benzocyclobutene (BCB). Modulator 30 will be described in detail later. Input lens system 25 is mounted between modulator 30 and composite optical component 13. First output lens system 26 and second output lens system 27 are respectively mounted on two sides of input lens system 25 in second direction D2.

Optical module 1 includes a heat sink 41 located opposite to composite optical component 13 with modulator 30 between them, and a driver IC 42 which is a driving circuit mounted on heat sink 41. Driver IC 42 includes an electrode pad 42*b*. Electrode pads 42*b* are arranged along second direction D2 at the end of driver IC 42 on the side of modulator 30. Optical module 1 has a wiring pattern 2*j* (see FIG. 3 or FIG. 4) provided on a frame body 2*h* of housing 2.

Wiring pattern 2*j* are arranged along first direction D1 on one side of second direction D2 of housing 2. Modulator 30 has an electrode pad 30*c* at a position facing driver IC 42, and electrode pads 30*c* are arranged along second direction D2. Optical module 1 includes a bonding wire W1 that electrically connects electrode pad 30*c* and electrode pad 42*b* to each other. Modulator 30 includes a control terminal 30*b*. Control terminals 30*b* are arranged along first direction D1 on one side of second direction D2 of modulator 30. Wiring pattern 2*j* is electrically connected to control terminal 30*b* of modulator 30 via a bonding wire W2. Optical module 1 includes a thermistor 24. Thermistor 24 is disposed, for example, between modulator 30 and composite optical component 13. Thermistor 24 is electrically connected to a pad 2*k* (see FIG. 4) provided on frame body 2*h* via a bonding wire W3.

Figure 6:
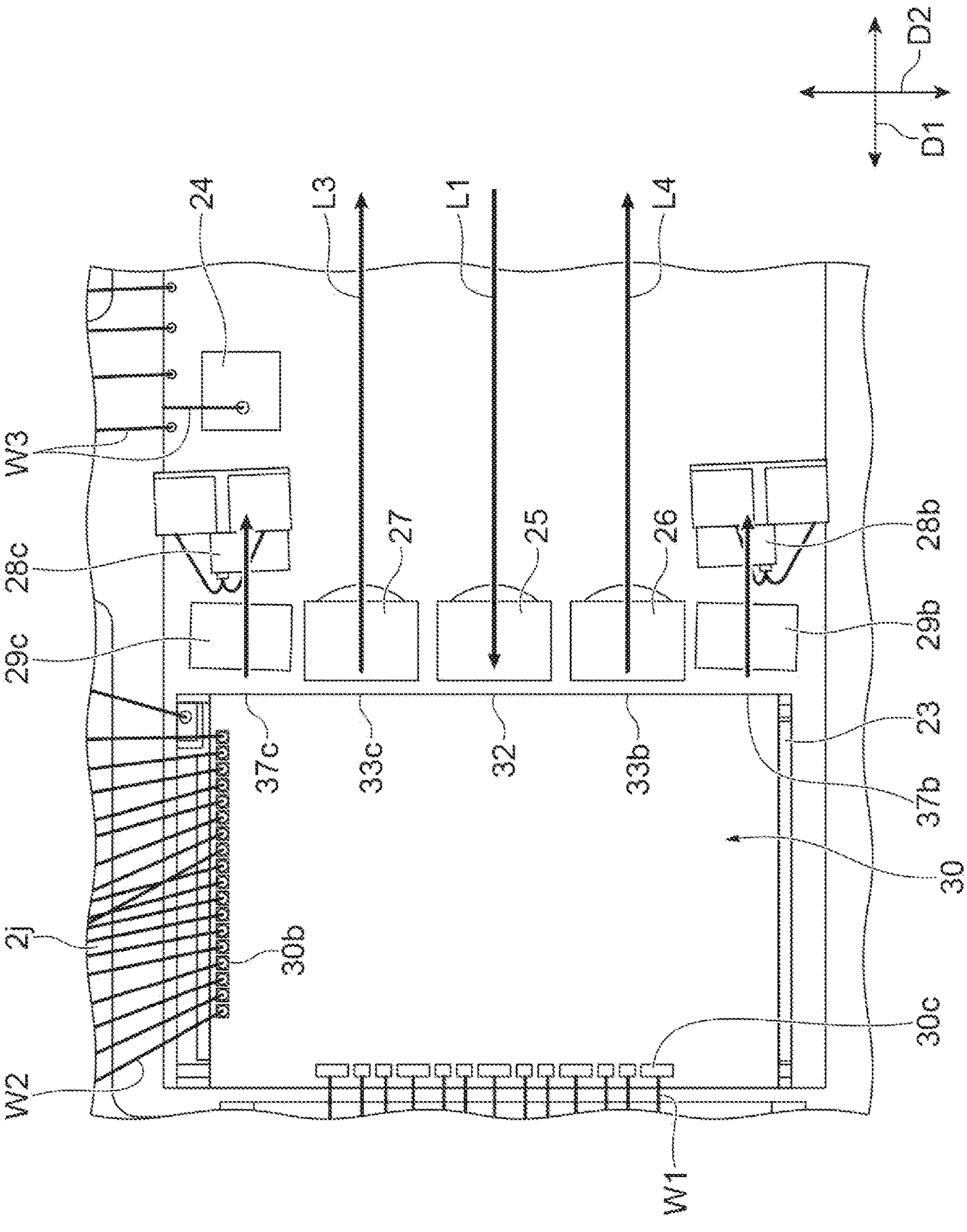
FIG. 6 is a plan view showing the semiconductor modulator, input lens system, first output lens system, second output lens system, first monitor PD, second monitor PD, first polarizer, and second polarizer of the optical module of FIG. 1.
Figure 7:
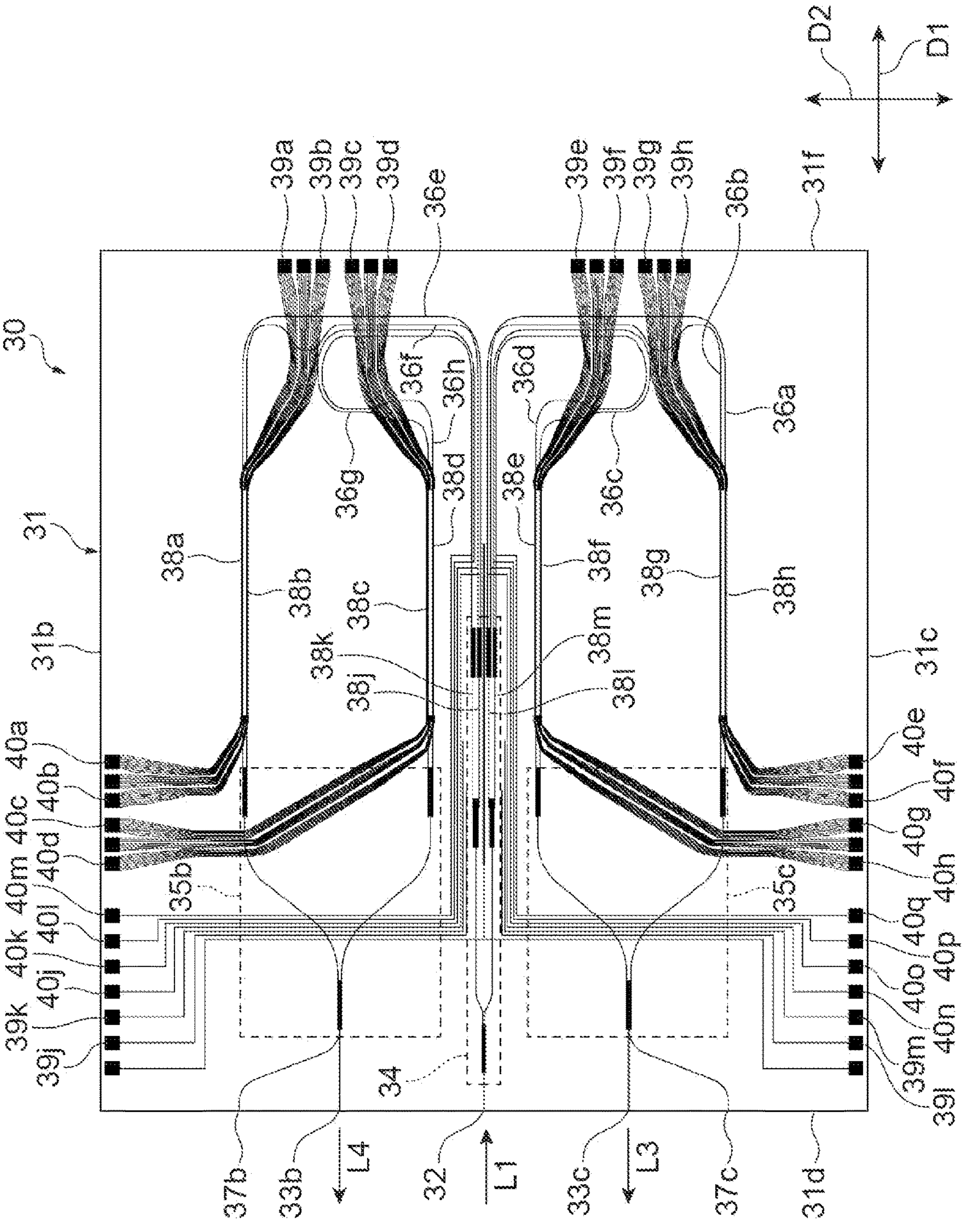
FIG. 7 shows the semiconductor modulator of FIG. 6.

FIG. 6 is an enlarged plan view of the periphery of modulator 30, input lens system 25, first output lens system 26 and second output lens system 27. FIG. 7 is a plan view showing modulator 30. Modulator 30 is, for example, a multimode interferometer having a plurality of optical waveguides. As shown in FIGS. 6 and 7, modulator 30 includes, for example, a modulator chip 31, an input port 32, a first output port 33*b*, a second output port 33*c*, a dividing portion 34, a first multiplexing portion 35*b*, a second multiplexing portion 35*c*, optical waveguides 36*a* to 36*h*, a first monitor port 37*b*, and a second monitor port 37*c*.

The planar shape of modulator chip 31 is a rectangular shape. Modulator chip 31 has sides 31*b* and 31*c* extending in first direction D1 and sides 31*d* and 31*f* extending in second direction D2. Input port 32 is a light port through which input light L1 emitted from composite optical component 13 (second reflection surface 13*d*) is input into modulator 30 through input lens system 25. Input port 32 is located at side 31*d*. For example, input port 32 is located at the midpoint of side 31*d*. Driver IC 42 is disposed on side 31*f* of modulator 30.

First output port 33*b* is a light port that outputs output light L4 that is the first polarization signal light to first output lens system 26, and second output port 33*c* is a light port that outputs output light L3 that is the second polarization signal light to second output lens system 27. Output light L4 output from first output port 33*b* is transmitted through first output lens system 26 and incident on composite optical component 13. Output light L3 output from second output port 33*c* is transmitted through second output lens system 27 and incident on composite optical component 13. First output port 33*b* and second output port 33*c* are provided on side 31*d* of modulator chip 31. First output port 33*b* and second output port 33*c* are disposed at positions symmetrical with each other with respect to input port 32.

Optical module 1 includes a first monitor PD (monitor element) 28*b* and a second monitor PD (monitor element) 28*c*. First monitor PD 28*b* receives the monitor signal light output from first monitor port 37*b*. First monitor PD 28*b* outputs a detection signal corresponding to the intensity of the received monitor signal light. This detection signal is output to the outside of optical module 1 from any one of the plurality of lead pins 6*b* electrically connected to first monitor PD 28*b* via a wire (not shown), for example. Second monitor PD 28*c* receives the monitor signal light output from second monitor port 37*c*. Second monitor PD 28*c* outputs a detection signal corresponding to the intensity of the received monitor signal light. This detection signal is output to the outside of optical module 1 from any one of the plurality of lead pins 6*b* electrically connected to second monitor PD 28*c* via a wire (not shown), for example.

Optical module 1 includes a first polarizer 29*b* located between first monitor PD 28*b* and first monitor port 37*b*, and a second polarizer 29*c* located between second monitor PD 28*c* and second monitor port 37*c*. First polarizer 29*b* receives the monitor signal light from first monitor port 37*b*. First polarizer 29*b* transmits only linearly polarized light (P-polarized light) of the monitor signal light. First monitor PD 28*b* receives only the linearly polarized light of the monitor signal light. Second polarizer 29*c* receives the monitor signal light from second monitor port 37*c*. Like first polarizer 29*b*, second polarizer 29*c* transmits only the linearly polarized light of the monitor signal light, and second monitor PD 28 receives only the linearly polarized light of the monitor signal light.

As shown in FIG. 7, dividing portion 34 divides input light L1 input from input port 32 to optical waveguides 36*a* to 36*h*. First multiplexing portion 35*b* multiplexes the signal lights (a part of the signal lights) propagated through optical waveguides 36*e* to 36*h* and provides the multiplexed signal light to first output port 33*b* as output light L4. Second multiplexing portion 35*c* multiplexes the signal lights (the rest of the plurality of signal lights) propagated through optical waveguides 36*a* to 36*d* and provides the multiplexed signal light to second output port 33*c* as output light L3.

First monitor port 37*b* outputs the monitor signal light to first polarizer 29*b*. First monitor port 37*b* is a light port that relatively monitors the intensity of light output from first multiplexing portion 35*b*. Second monitor port 37*c* outputs the monitor signal light to second polarizer 29*c*. Second monitor port 37*c* is a light port that relatively monitors the intensity of light output from second multiplexing portion 35*c*. First monitor port 37*b* and second monitor port 37*c* are disposed at positions at which first monitor port 37*b* and second monitor port 37*c* are symmetrical with each other with respect to input port 32 on side 31*d*. Input port 32, first output port 33*b*, and second output port 33*c* are disposed between first monitor port 37*b* and second monitor port 37*c* (on the center side of modulator chip 31 in second direction D2).

Modulator 30 includes modulation electrodes (electrodes) 38*a* to 38*h*, parent phase adjustment electrodes 38*j* to 38*m*, and child phase adjustment electrodes (not shown). Modulation electrodes 38*a* to 38*h* are provided in optical waveguides 36*a* to 36*h*, respectively. Modulation electrodes 38*a* to 38*h* apply the modulated voltage signals to optical waveguides 36*a* to 36*h* to change the refractive indexes of the light passing through optical waveguides 36*a* to 36*h*. Thus, the phase of light propagating through optical waveguides 36*a* to 36*h* is modulated.

One end of each of modulation electrodes 38*a* to 38*h* is electrically connected to each of RF pads 39*a* to 39*h* for signal input via a wiring pattern. RF pads 39*a* to 39*h* for signal input are electrically connected to driver IC 42. The other end of each of modulation electrodes 38*a* to 38*h* is electrically connected to each of signal pads 40*a* to 40*h* for signal termination via a wiring pattern. Parent phase adjustment electrodes 38*j* to 38*m* are electrically connected to respective bias pads 39*j* to 39*m* via the wiring pattern. The child phase adjustment electrode is connected to each of bias pads 40*j* to 40*q* for an adjusting signal input via a wiring pattern.

Next, a specific example of a method of assembling optical module 1 according to the embodiment will be described. First, housing 2 is prepared. Temperature control device 21, modulation element base 22, modulation element carrier 23, and modulator 30 are mounted over bottom wall 2*d* of housing 2, and heat sink 41 and driver IC 42 are also mounted over bottom wall 2*d* of housing 2. Then, optical base 11 is mounted on bottom wall 2*d*, and composite optical component 13 is mounted on optical base 11. At this time, for example, as a countermeasure against reflected light, composite optical component 13 is fixed to optical base 11 by epoxy resin while being inclined at a predetermined angle (for example, 2°) with respect to first direction D1 (the optical axis of input light L1).

First polarizer 29*b* and second polarizer 29*c* are mounted on modulation element base 22. For example, first polarizer 29*b* and second polarizer 29*c* are mounted so as to be inclined at a predetermined angle with respect to first direction D1 as a countermeasure against reflected light. Subsequently, first monitor PD 28*b* is mounted at a position facing first monitor port 37*b*, and second monitor PD 28*c* is mounted on modulation element base 22 at a position facing second monitor port 37*c* (a step of disposing a monitor light-receiving element). At this time, as described above, first monitor PD 28*b* and second monitor PD 28*c* are mounted so as to be inclined at a predetermined angle with respect to first direction D1 as a countermeasure against reflected light. After aligning and mounting of input lens system 25 are performed, aligning and mounting of first output lens system 26 and second output lens system 27 are performed. Then, input assembly 3 and output assembly 4 are fixed to second side wall 2*c* of housing 2 by YAG welding, thereby completing a series of steps of the method of assembling optical module 1.

Next, the effects obtained from optical module 1 according to the embodiment of the present disclosure will be described. Optical module 1 includes modulator 30 having input port 32, first output port 33*b*, second output port 33*c*, first monitor port 37*b*, and second monitor port 37*c*. Input lens system 25 faces input port 32. First output lens system 26 faces first output port 33*b*, and second output lens system 27 faces second output port 33*c*. Optical module 1 includes first monitor PD 28*b* facing first monitor port 37*b* and second monitor PD 28*c* facing second monitor port 37*c*. First polarizer 29*b* is disposed between first monitor port 37*b* and first monitor PD 28*b*, and second polarizer 29*c* is disposed between second monitor port 37*c* and second monitor PD 28*c*. Therefore, each of first polarizer 29*b* and second polarizer 29*c* cuts off the deviated polarized light component, and the light from which the deviated polarized light component is cut off is input to first monitor PD 28*b* and second monitor PD 28*c*. Therefore, it is possible to reduce leakage light including a deviated polarized light component to first monitor PD 28*b* and second monitor PD 28*c*.

In the embodiment, on the side surface (side 31*d*) of modulator 30, first output port 33*b* and second output port 33*c* may be disposed at positions at which first output port 33*b* and second output port 33*c* are symmetrical with each other with respect to input port 32, and first monitor port 37*b* and second monitor port 37*c* may be disposed at positions at which first monitor port 37*b* and second monitor port 37*c* are symmetrical with each other with respect to input port 32.

Figure 8:
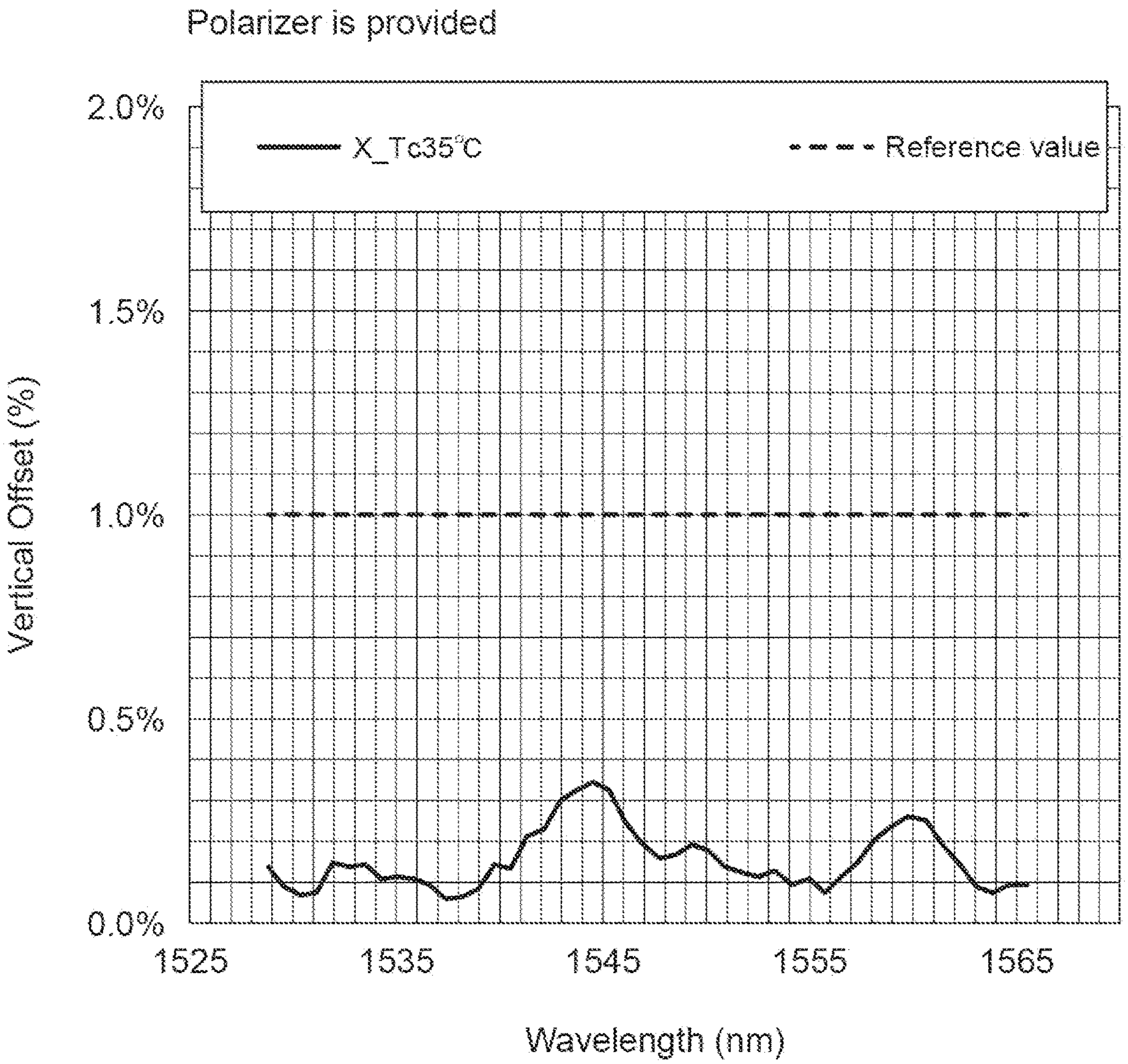
FIG. 8 is a graph showing a relationship between a wavelength of light and a deviation of a polarization state in an optical module according to an embodiment.
Figure 9:
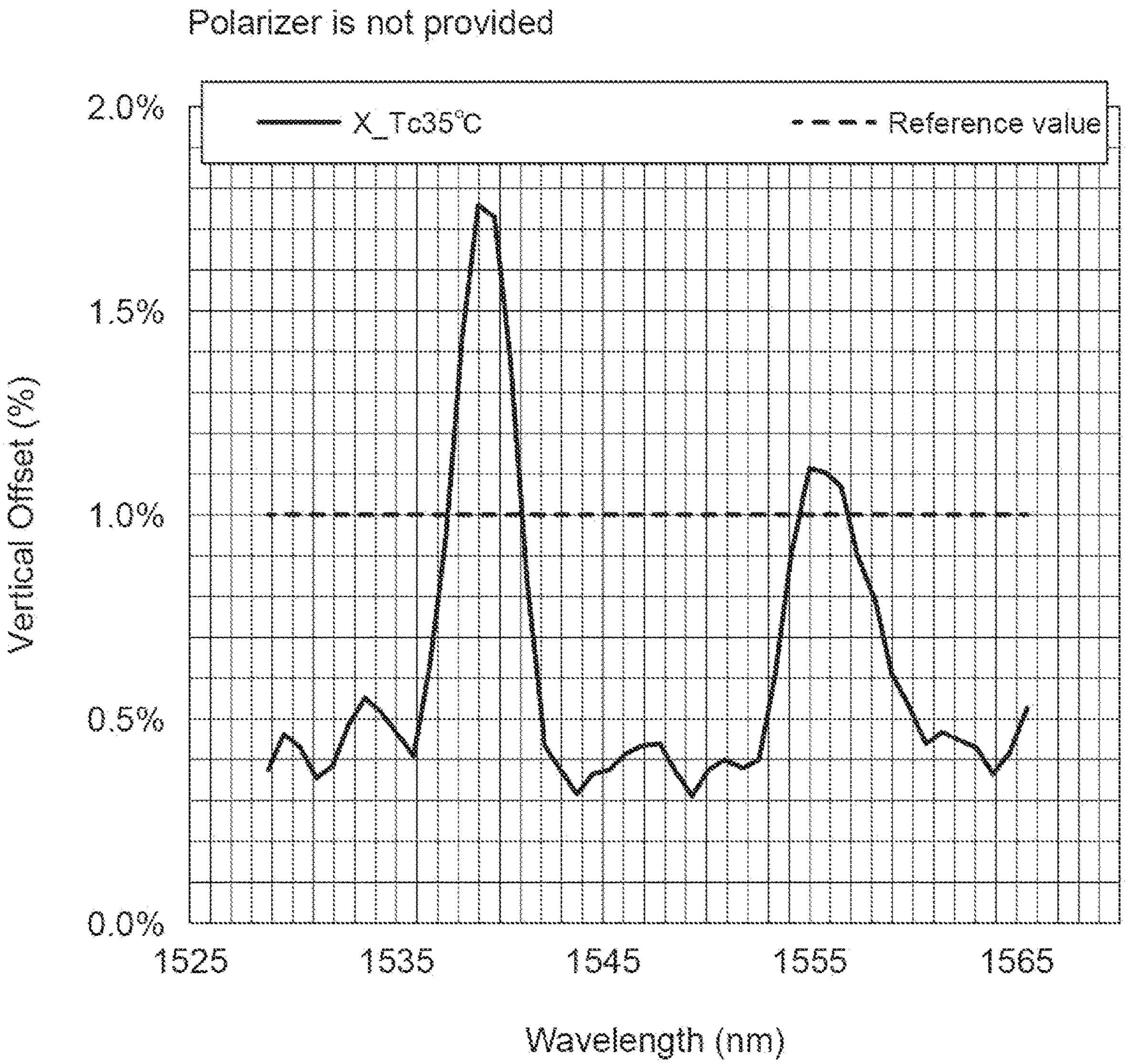
FIG. 9 is a graph showing a relationship between a wavelength of light and a deviation of a polarization state in an optical module according to a comparative example.

Incidentally, an index called Vertical Offset defined as a ratio between a current value of the monitor PD in the extinction state of modulator 30 and a current value of the monitor PD in the light transmission state of modulator 30 is known. It means that the larger the value of Vertical Offset is, the more first monitor PD 28*b* and second monitor PD 28*c* are affected by stray light. FIG. 8 is a graph showing the relationship between the wavelength band of light and the Vertical Offset in optical module 1 according to the embodiment having first polarizer 29*b* and second polarizer 29*c*. FIG. 9 is a graph showing the relationship between the wavelength band of light and the Vertical Offset in an optical module according to a comparative example which does not have first polarizer 29*b* and second polarizer 29*c*.

"X_Tc35° C." in FIGS. 8 and 9 indicates one of first monitor PD 28*b* and second monitor PD 28*c* at 35° C. As shown in FIGS. 8 and 9, in a comparative example (see FIG. 9) in which first polarizer 29*b* and second polarizer 29*c* are not provided, the Vertical Offset may exceed the reference value (1.0%) in a part of the band of wavelengths from 1530 nm to 1565 nm, and it can be seen that there is an influence of the stray lights. On the other hand, in an example (see FIG. 8) in which first polarizer 29*b* and second polarizer 29*c* are provided, the Vertical Offset is lower than the reference value in all the band of wavelengths from 1530 nm to 1565 nm, and it can be seen that the influence of stray lights is suppressed.

The embodiments of the optical module according to the present disclosure have been described above. However, the present invention is not limited to the embodiments described above. That is, it is easily recognized by those skilled in the art that various modifications and changes can be made to the present invention without departing from the gist described in the claims. For example, the shape, size, number, material, and arrangement of each component of the optical module are not limited to those described above and can be changed as appropriate. Furthermore, the contents and order of the steps of the method for assembling the optical module are not limited to those described above, and can be changed as appropriate.

What is claimed is:

1. An optical module comprising:

a semiconductor modulator having a rectangular planar shape, wherein the semiconductor modulator includes:
  an input port for receiving continuous light;
  a dividing portion for dividing the continuous light to obtain divided light rays;
  modulation electrodes for modulating the divided light rays, and converting one of the divided light rays into a first modulation signal to generate a first output light and converting another one of the divided light rays into a second modulation signal to generate a second output light;
  a first output port for outputting the first output light;
  a second output port for outputting the second output light;
  a first monitor port being configured to monitor the first output light; and
  a second monitor port being configured to monitor the second output light;

an input lens system facing the input port;
a first output lens system facing the first output port;
a second output lens system facing the second output port;
a first monitor element facing the first monitor port;
a second monitor element facing the second monitor port;
a first polarizer disposed outside of the semiconductor modulator and between the first monitor port and the first monitor element, the first polarizer being configured to transmit only a first linearly polarized light of a first monitor light, the first monitor light being transmitted through the semiconductor modulator; and
a second polarizer disposed outside of the semiconductor modulator and between the second monitor port and the second monitor element, the second polarizer being configured to transmit only a second linearly polarized light of a second monitor light, the second monitor light being transmitted through the semiconductor modulator,
wherein the semiconductor modulator has a side surface,
wherein, at the side surface, the first output port and the second output port are each disposed on a corresponding one of two sides of the input port,
wherein the first monitor port is disposed on a side of the first output port, the side being opposite to a side thereof where the input port is disposed; and
wherein the second monitor port is disposed on a side of the second output port, the side being opposite to a side thereof where the input port is disposed.

2. The optical module according to claim 1,
wherein, at the side surface of the semiconductor modulator, the first output port and the second output port are disposed at positions at which the first output port and the second output port are symmetrical with each other with respect to the input port, and
the first monitor port and the second monitor port are disposed at positions at which the first monitor port and the second monitor port are symmetrical with each other with respect to the input port.

3. The optical module according to claim 1,
wherein the first polarizer is linearly disposed between the first monitor port and the first monitor element along a longitudinal direction of the optical module; and
the second polarizer is linearly disposed between the second monitor port and the second monitor element along a longitudinal direction of the optical module.

4. An optical module comprising:

a semiconductor modulator having a rectangular planar shape, wherein the semiconductor modulator includes:
  an input port for receiving continuous light;
  a dividing portion for dividing the continuous light to obtain divided light rays;
  modulation electrodes for modulating the divided light rays, and converting one of the divided light rays into a first modulation signal to generate a first output light and converting another one of the divided light rays into a second modulation signal to generate a second output light;
  a first output port for outputting the first output light;
  a second output port for outputting the second output light;
  a first monitor port being configured to output a first monitor signal light of the first output light; and a second monitor port being configured to output a second monitor signal light of the second output light;

an input lens system facing the input port;

a first output lens system facing the first output port;

a second output lens system facing the second output port;

a first polarizer disposed outside of the semiconductor modulator and facing the first monitor port, the first polarizer being configured to transmit only a first linearly polarized light of the first monitor signal light, the first monitor signal light being outputted from the first monitor port of the semiconductor modulator; and a second polarizer disposed outside of the semiconductor modulator and facing the second monitor port, the second polarizer being configured to transmit only a second linearly polarized light of the second monitor signal light, the second monitor signal light being outputted from the second monitor port of the semiconductor modulator, a first monitor element configured to receive the first linearly polarized light from the first polarizer and output a detection signal corresponding to the first received linearly polarized light;

a second monitor element configured to receive the second linearly polarized light from the first polarizer output a detection signal corresponding to the second received linearly polarized light, wherein the first polarizer is disposed between the first monitor port and the first monitor element, and the second polarizer is disposed between the second monitor port and the second monitor element, wherein the semiconductor modulator has a side surface, wherein, at the side surface, the first output port and the second output port are each disposed on a corresponding one of two sides of the input port, wherein the first monitor port is disposed on a side of the first output port, the side being opposite to a side thereof where the input port is disposed; and wherein the second monitor port is disposed on a side of the second output port, the side being opposite to a side thereof where the input port is disposed.

* * * * *